Nov. 5, 1929.   C. P. EISENHAUER   1,734,163
HEATING, VENTILATING, AND HUMIDIFYING APPARATUS
Filed May 4, 1928   9 Sheets-Sheet 7
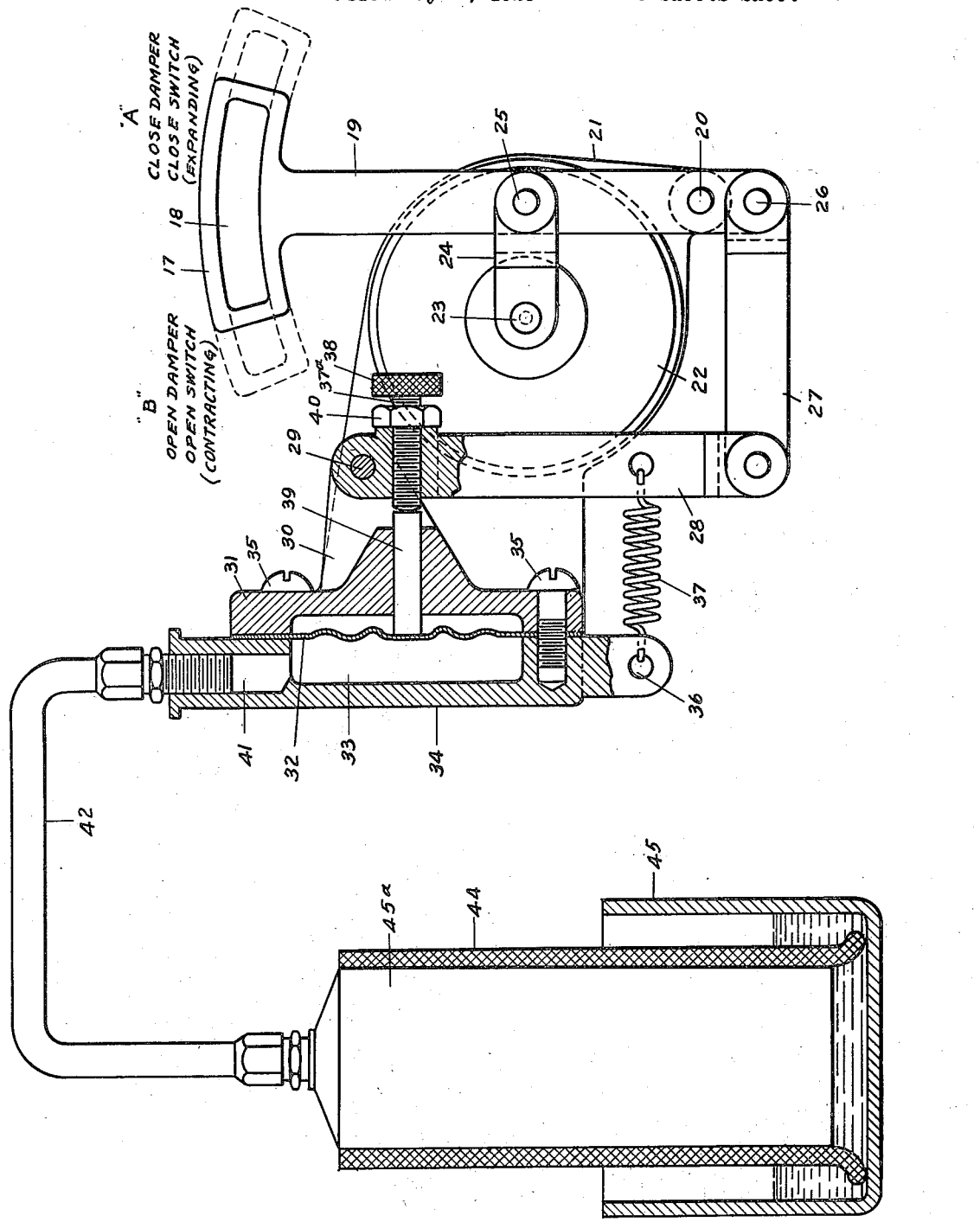
INVENTOR
CHARLES P. EISENHAUER.
BY Toulmin & Toulmin
ATTORNEYS

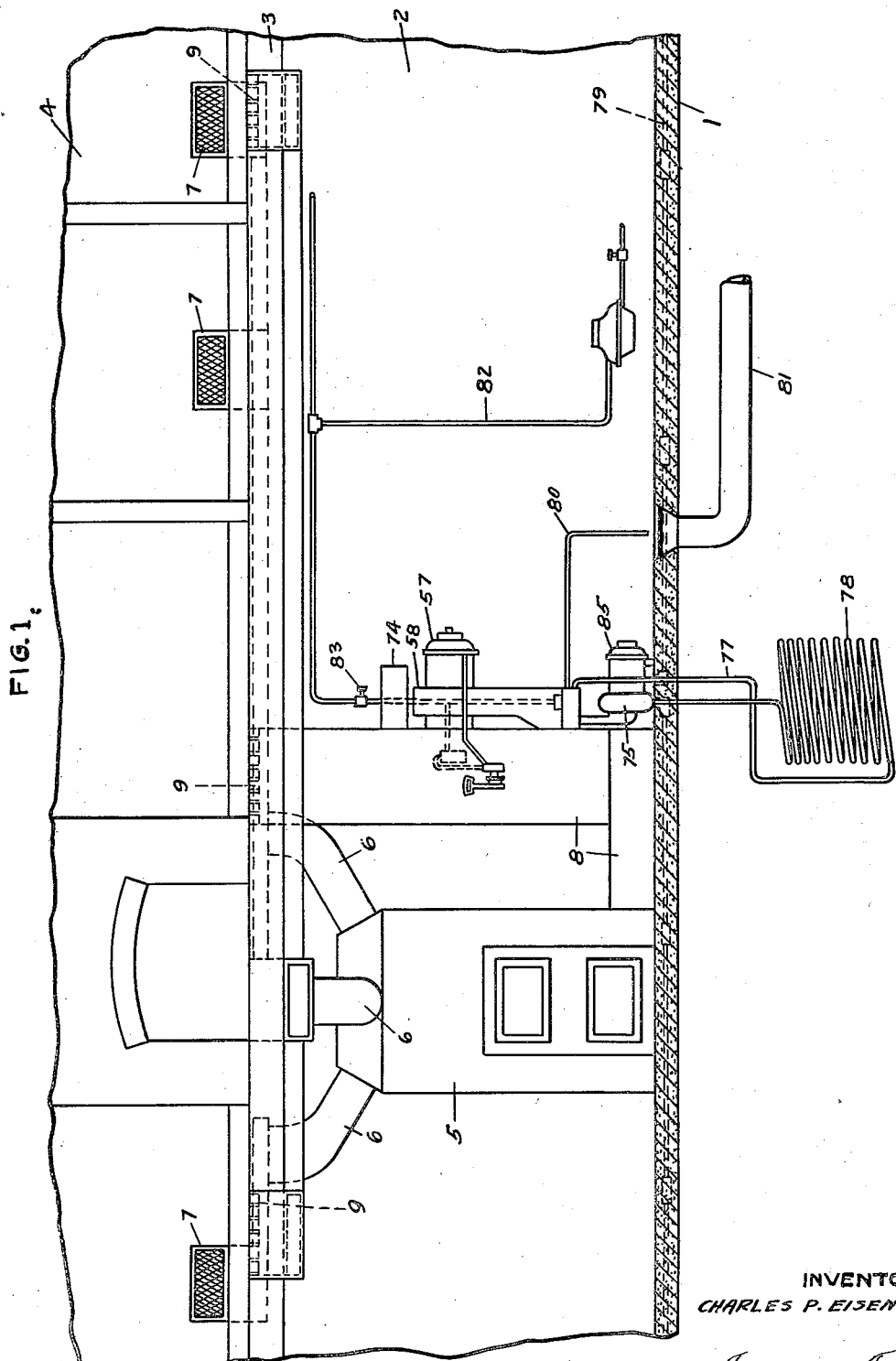

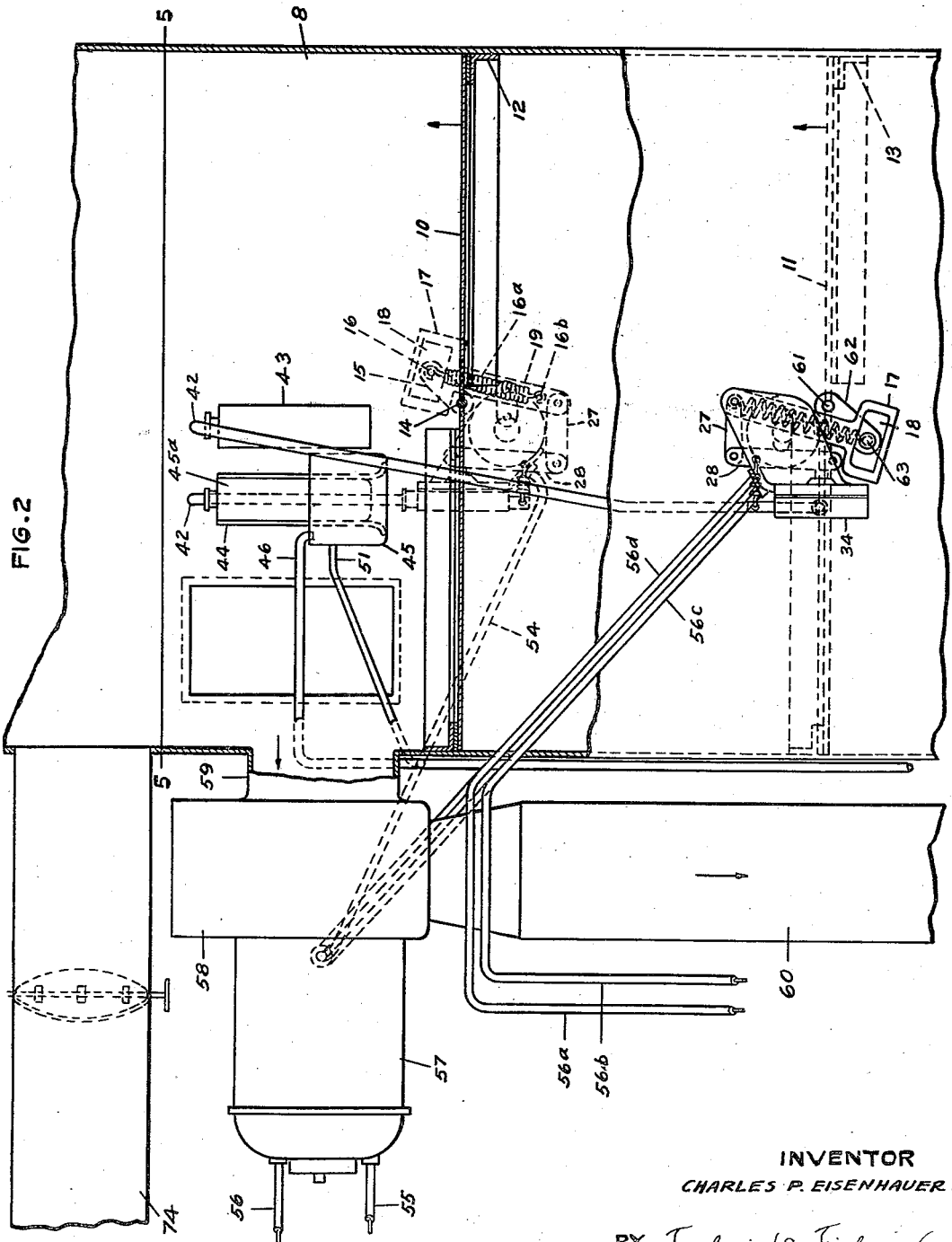

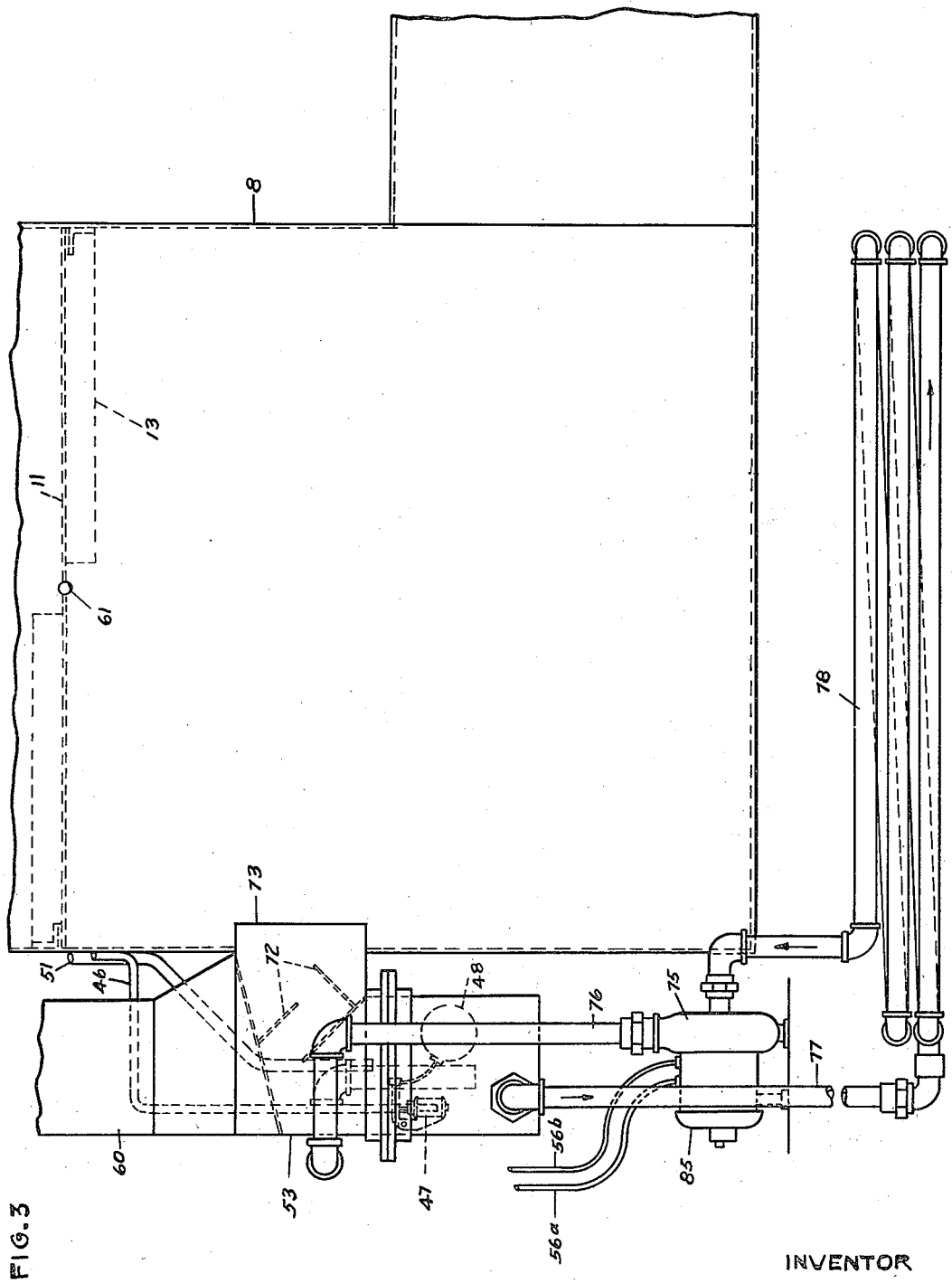

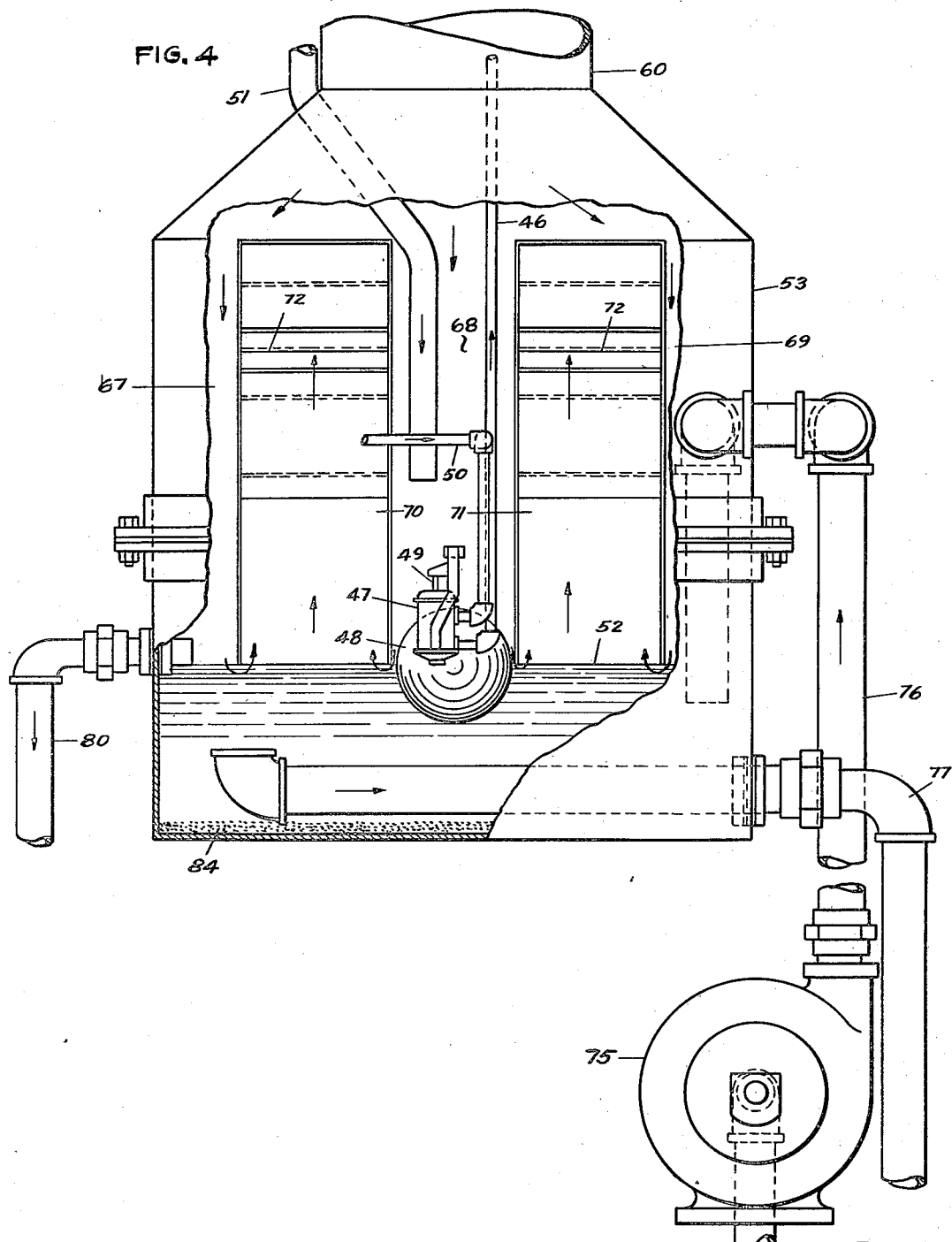

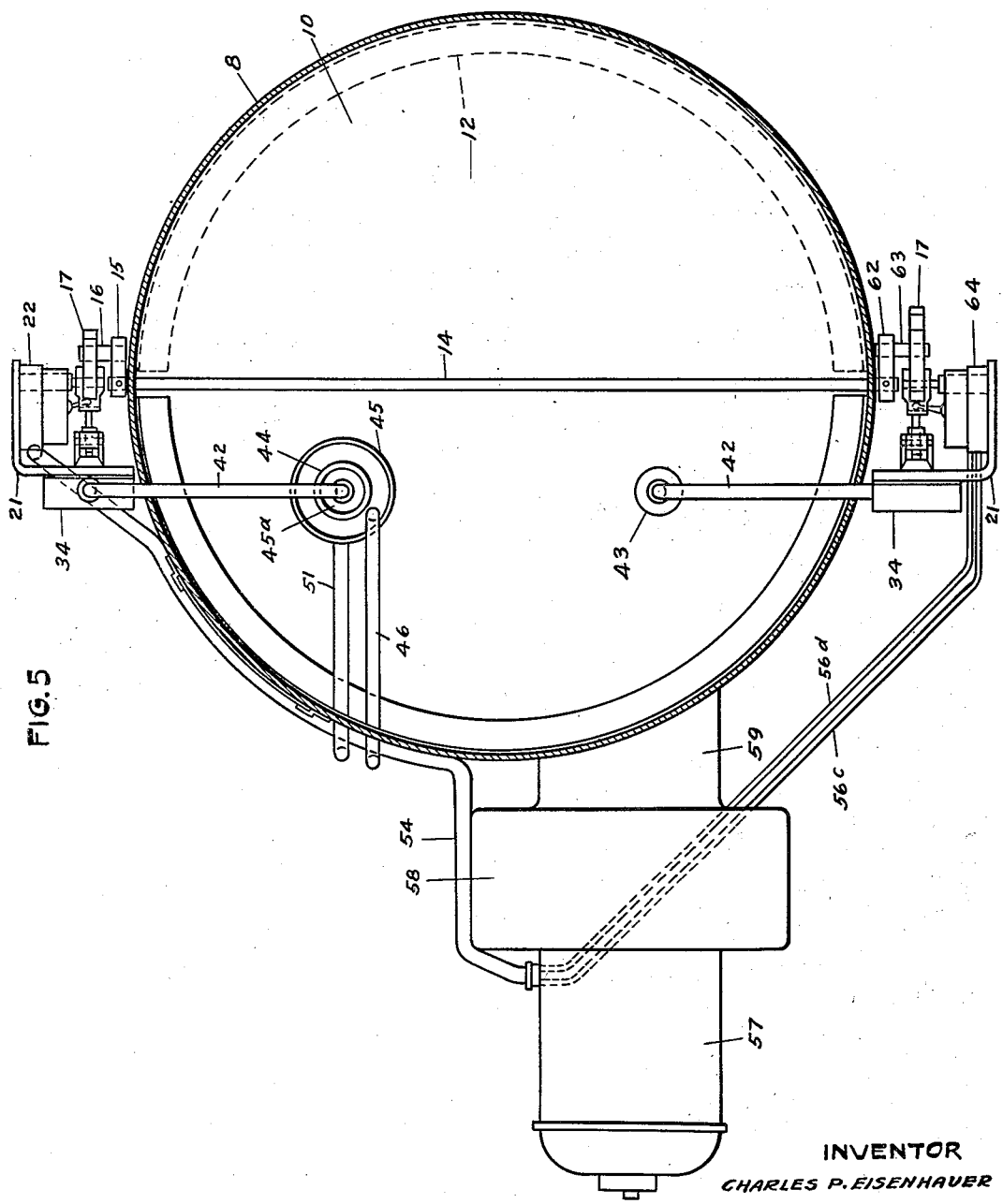

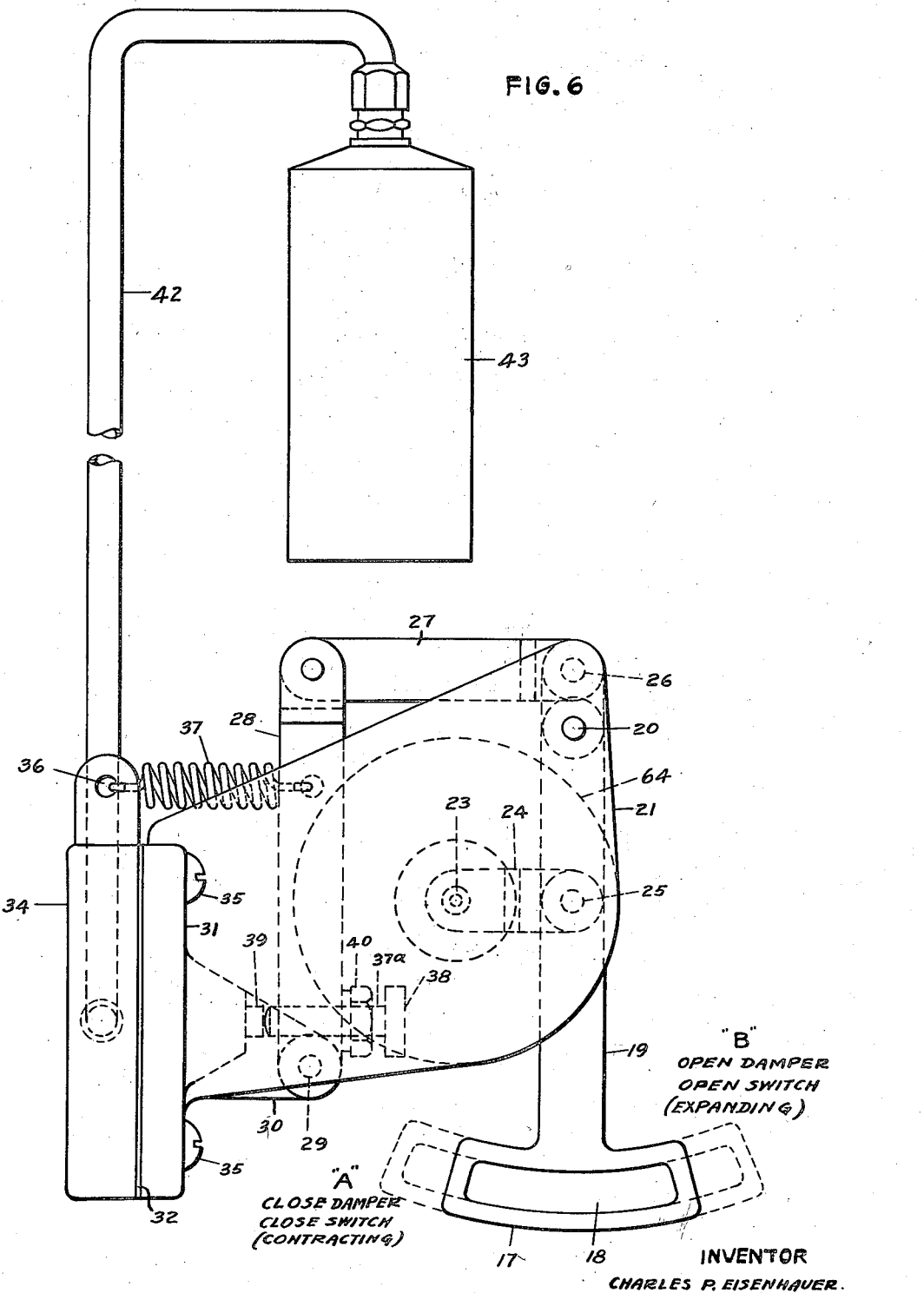

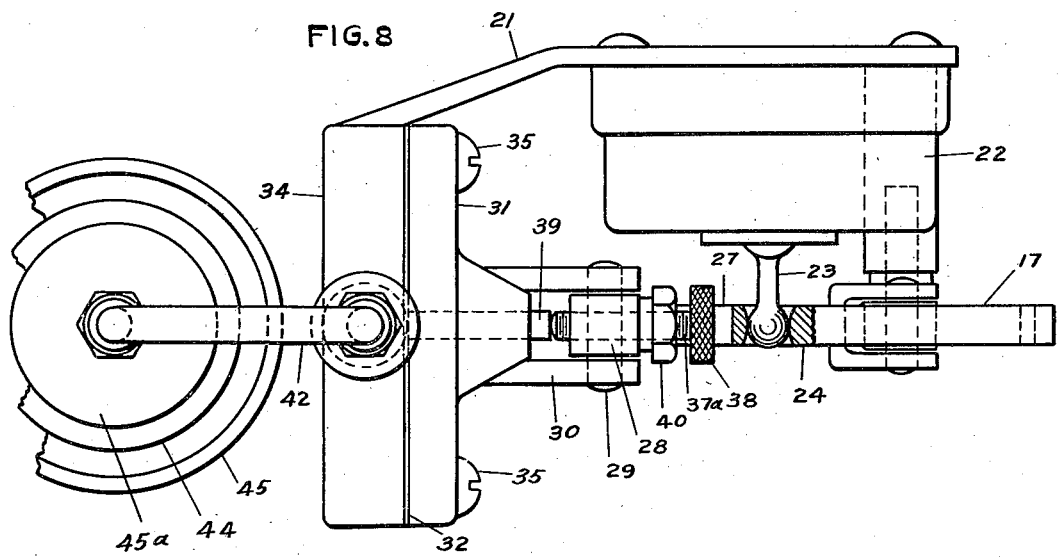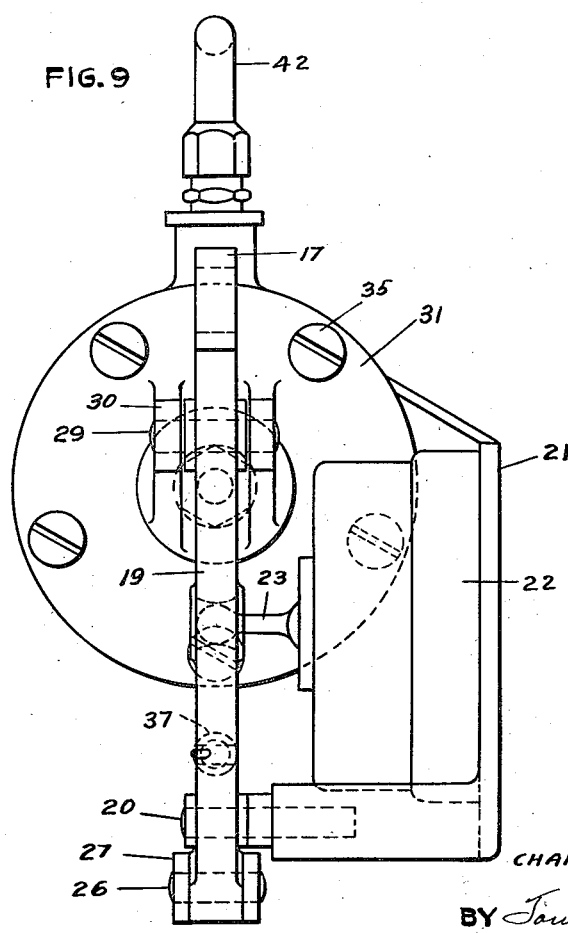

Nov. 5, 1929.  C. P. EISENHAUER  1,734,163
HEATING, VENTILATING, AND HUMIDIFYING APPARATUS
Filed May 4, 1928  9 Sheets-Sheet 9

INVENTOR
CHARLES P. EISENHAUER.
BY Toulmin & Toulmin
ATTORNEYS

Patented Nov. 5, 1929

1,734,163

UNITED STATES PATENT OFFICE

CHARLES P. EISENHAUER, OF DAYTON, OHIO

HEATING, VENTILATING, AND HUMIDIFYING APPARATUS

Application filed May 4, 1928. Serial No. 275,226.

My invention relates to heating, purifying, ventilating and humidifying apparatus, and a method of circulating, purifying and controlling temperature and humidity conditions within enclosures.

It is the object of my invention to provide a very simple mechanism adaptable to any type of domestic or commercial building, which will make available a control of humidity and temperature conditions both in winter and summer and will be sufficiently simple in its operation and economical in its cost to be available for domestic establishments of modest character and expense. Heretofore, only large commercial buildings, such as hospitals, schools and the like could afford the large and complicated installations for maintaining temperature and moisture conditions, circulating and purifying air.

In addition thereto, it is my object to provide a novel arrangement of economically maintaining these conditions in connection with the furnaces and heaters ordinarily found in domestic dwellings and for cooling such dwellings in an economical manner.

Referring to the drawings:

Figure 1 is an elevation of my equipment installed embodying my invention as located in a house which is shown in section;

Figure 2 is a section through the air inlet passageway showing the damper arrangement with the blower and blower piping in elevation;

Figure 3 is a detail side elevation of the moisture apparatus;

Figure 4 is a rear elevation partially in section with the rear wall broken away of the moisture apparatus:

Figure 5 is a section on the line 5—5 of Figure 2 showing in plan the arrangement of the air intake, blower, dampers and controls;

Figure 6 is a detail view showing the thermostatic control apparatus for the damper controlling the heat;

Figure 7 is a similar view in section showing the hygrostatic apparatus and control;

Figure 8 is a top plan view of Figure 7 partially in section;

Figure 9 is an end elevation thereof from the right hand end of Figure 8;

Figure 10:
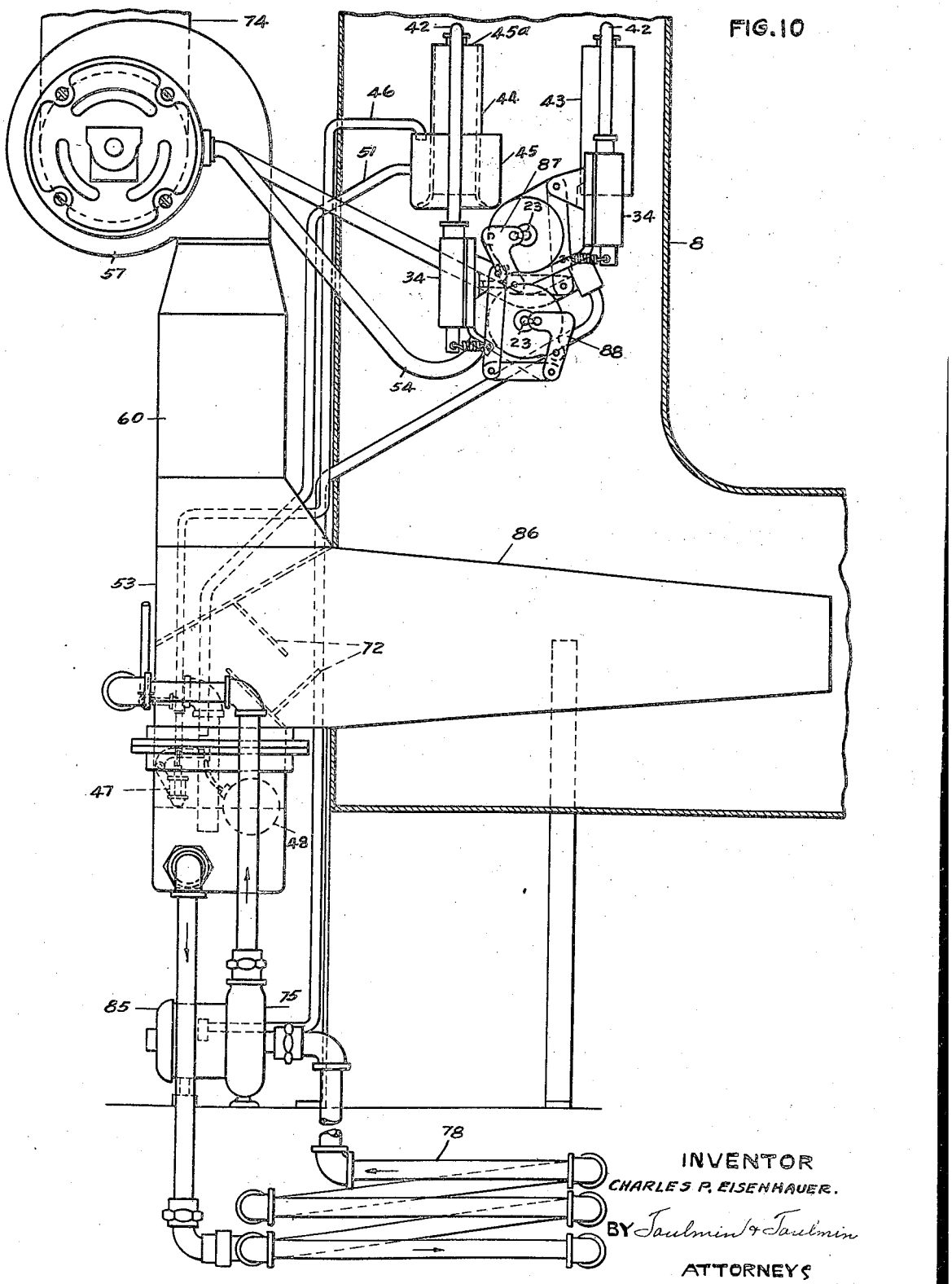
Figure 10 is a side elevation of a modified form of my invention where dampers are eliminated and an injector is substituted.

It will be understood that it is the object of my invention to effect four primary conditions, such as:

(1) Keep the correct humidity, winter or summer, in a given enclosure, such as a house or building.

(2) To lower temperatures, natural or artificial, to within comfortable limits winter or summer.

(3) Remove dirt, dust and carbon dioxide from the air.

(4) Cause the circulation of air.

My invention is designed to operate with air systems in the same circuit with one or more cold air inlet ducts and one or more hot air outlet ducts, or it may operate as an independent system having its own inlet and outlet ducts, in which event, the heating system may be either hot air, steam, hot water, vapor or the like.

Referring to the drawings in detail, 1 is the cellar floor of a building having cellar walls 2, a first floor 3 with side walls 4.

Within the cellar is a furnace 5 having hot air outlet ducts 6 discharging through hot air outlets 7 into the rooms. The furnace is supplied with an air inlet passageway 8. The pipe 8 for incoming fresh air to the furnace communicates with outside of the building or it may take in the air for the building from some point or points inside the building. Either method will be suitable for my invention, but I prefer to take it within the building as that reduces the expense of controlling the excessive temperature of the outside air.

This opening of the inlet duct 8 from within the building is designated 9. These ducts 8 lead to grilled floor openings usually on the first floor at convenient places.

Damper control

The passageway 8 is provided with a pair of superimposed spaced dampers 10 and 11 which are controlled by the humidity and temperature regulators. The damper 10 is known as the humidity damper and the damper 11 is known as the temperature damper.

These dampers move in the direction of the arrows to open position, but when in their horizontal position, as shown in Figure 2, resting against the brackets 12 and 13 they are in their closed position.

Humidity damper and controls

The damper 10 is pivotally mounted upon a shaft 14 which projects out through the side of the tubular passageway 8. This pivotal rod is connected by an outside arm 15 through a pin projecting at right angles thereto designated 16. This pin in turn is moved by a yoke 17 into the eye 18 in which is projected the end of the pin 16. The spring 16a is connected to the pin 16 at one end and to the pivot pin 20 of lever 19 at 16b at the other end so as to maintain the damper in either shut or open position. This yoke is mounted upon a lever 19 pivoted at 20 upon a bracket 21 that carries the switch box 22 having the switch lever 23. This switch lever is connected by the pivoted link 24 through the pivotal connection 25 to the yoke arm 19.

The lower end of the yoke arm 19 is pivotally connected at 26 to a pitman 27 which in turn is pivotally connected to a lever 28 at the bottom of the lever. The top of this lever is pivoted at 29 to the bracket 30 of a cover 31 of a pressure chamber. In this pressure chamber is located a diaphragm 32 forming one wall of the pressure chamber 33, the rear wall of which is designated 34 and forms a rear half of the casing, the front of which is 31. These two halves are connected by screw bolts 35 that embrace between them the edges of the diaphragm 32.

The lower end of this casing back 34 is provided with an eye 36 into which is connected a helical spring 37, the free end of which is connected to the lever 28 to normally move that lower end of the lever towards the diaphragm 32. This has the effect of pressing the adjustable screw pin 37a which is adjusted by the knurled head 38 in the lever 28 against the diaphragm pin 39, the other end of which engages with the outer surface of the diaphragm in an outward direction by the pressure in the chamber 33. It is actuated in an inward direction against the diaphragm by the spring 37 operating on the lever 28 and carrying the head of the adjustable screw 37a against the head of the diaphragm pin 39. This adjustable screw 37a may be maintained in any adjusted position by the lock nut 40.

Pressure is applied to the chamber 33 through the passageway 41, pipe 42 from the chamber 45a which acts as the hygrostatic element located within the passageway 8.

This hygrostatic element 45a is surrounded by a wick 44, the lower end of which dips within a cup 45 that is supplied with moisture through the moisture supply pipe 46. This moisture supply pipe is connected to a valve 47 that is in turn controlled by the float 48 and float arm 49. Liquid is supplied from the outside through the inlet pipe 50 that empties into the valve 47. Any overflow to this cup is taken away by the overflow pipe 51, which discharges into the pool of liquid 52 in the humidifier casing 53, the construction and operation of which is described hereinafter.

This humidistat or hygrostat being provided with the associated switch 22 thereby controls a circuit through the wires contained in the cable 54. This circuit is supplied with power through the lines 55 and 56 to the motor 57 of the blower 58. This blower takes in air in the passageway 59 and discharges it through the passageway 60 to the humidifier casing 53.

The dampers 10 and 11 insure the air being taken in through the passageway 59 and discharge below the dampers and thence to the furnace and thence to the house without the air being so conditioned being discharged upwardly through the passageway 8 before reaching the furnace and the house.

Temperature damper and controls.

The temperature damper 11 is mounted upon its supporting pivot 61 which has an axle projecting through the sides of the tubular casing 8. This axle is in turn connected on the outside of the casing 8 to an arm 62 having a pin 63 which projects into a yoke similar to yoke 17 for the hygrostat. The parts are arranged in the same manner as in connection with the hygrostat.

The container of expansible gas or liquid 43 is not surrounded, however, with a wick and cup.

The thermostat switch which is designated 64 is controlled by the thermostatic liquid or gas container 43. This switch 64 controls a circuit 56c and 56d connected into the blower motor 57 of the pump 75 and of the pump motor 85 to control its operation.

The wires 56a and 56b are connected to the motor 85 of the pump 75 so that the pump may be operated at the same time.

Humidifying apparatus

The humidifier consists of a casing 53 having an air inlet passageway 60 from the blower. The air is discharged through the top of the casing downwardly through three passageways 67, 68 and 69. The three air streams impinge upon and must come in contact with the pool of water 52. They then pass upwardly through the spaced passageways 70 and 71 over scrubber plates 72 and thence the moisture laden air from which the excessive moisture has been removed by the scrubber plates 72 passes out the discharge opening 73 of the humidifier into the passageway 8 and thence to the furnace, such point of discharge being below the dampers so that when the dampers are closed, the moisture laden and conditioned air will not pass upwardly instead of to the furnace.

The incoming air for the blower is preferably brought in through the passageway 59 from a point about the dampers or it may be brought through a special passageway being designated 74. This is optional.

The water circuit consists of a circulating pump 75 which delivers water through the pipe 76 into the pool 52 and thence water is removed to the oulet pipe 77 to a coil 78 preferably located below the cellar floor where it will be kept cool. It may be embedded in the cellar floor as shown at 79 in dotted lines, or a specially constructed pit. If desired, piping 78 may be heated in winter time for tempering the air.

An overflow pipe from the pool 52 is provided designated 80 which drains into a drain 81 in the cellar floor that leads to the sewer. Additional water for the circulation system is supplied by the main supply pipe 82 that is controlled by a hand valve 83.

In the bottom of the pool 52 I provide a layer of lime 84 which, together with the water, serves to absorb from the incoming air its burden of carbon dioxide.

Sufficient fresh water may be added constantly to cause the upper surface of the water 52 to constantly drain away with its refuse through the drain 80. This is optional.

The motor 85 is connected to the pump 75 to actuate the pump and cause the circulation of liquid so that cooled liquid may be maintained in the reservoir 53 for controlling the temperature. This motor circuit is controlled by the temperature control mechanism and switch 64.

Referring to the modified form, shown in Figure 10, it will be noted that the dampers are omitted, the hygrostat controls the blower 57 and the thermostat controls the blower and pump 75 and motor 85 circulating the cooled liquid. The dampers are not so controlled as there are no dampers.

The outlet opening 73 of the conditioned air is elongated into an injector passageway 86.

The yokes have been left off of the thermostat and hygrostat mechanism as indicated and the yoke arms 19 and links 24 have been made solid one with the other, forming an angular lever designated respectively for the thermostat as 87 and for the hygrostat as 88. Otherwise, the operation is the same.

In all types of construction the connection between the switch button or lever 23 and link or arm 24 is sufficiently loose to permit of the movement of the parts while at the same time actuating the switch lever.

*Method of operation*

The method of operation of this mechanism, shown in all figures, except Figure 10, is as follows:

Air normally passes in the cold air duct 8, through the opening 9, past the open dampers 10 and 11 into the furnace and is discharged through the air outlets 7.

When the state of the incoming air is such as to so effect the hygrostat by this air passing over the wick 44 in the cup 45 by reason of low humidity content which brings about rapid evaporation and, therefore, cooling of the thermostatic medium in the container therefor designated $45^a$, the spring 37 is enabled to pull the yoke arm 19 so that its yoke 17 assumes position A shown in Figure 7. This results in closing the damper 10 and also closes the switch 22 which causes the blower 58 and its motor 57 to operate diverting the air around the damper 10 and passing it over the water in the humidifier so as to discharge moisture laden air or air of greater humidity than that going through the passageway 8 to be distributed to the house or dwelling, then the heating apparatus, or, if no heat is being used, then it will pass directly to the house through the passageway 6.

When the humidity conditions have been sufficiently balanced, the diaphragm will be expanded against the spring 37 and the result of moving the diaphragm pin 39, lever 28, pitman 27 and yoke arm 19 will be to move the yoke arm 19 to position B which opens the damper 10 and opens the switch 22, thereby stopping further operation of the blower. The blower and damper are controlled to operate together by the operation of the hygrostatic switch 22.

In the case of the thermostat switch, the circulation of the air by the blower over the water will control the temperature as the circulation of the water through the cooling pipes 78 will control the temperature of the water or such pipes 78 may be heated to heat the water. In any event, the temperature can be controlled by circulating the temperate water in the circulation system.

This thermostatic apparatus operates by the temperature working upon the thermostat container 43 which increases or decreases the pressure in the diaphragm chamber 33 against the diaphragm 32. This in turn operates the diaphragm pin 39, lever 28, pitman 27, and yoke arm 19. Such extension moves the yoke arm 19 to position B which closes the damper because of excessive heat and closes the switch, thereby operating the blower and the pump circulating cold water in the humidifier for reducing the temperature.

This operation continues until the temperature is reduced whereupon the contraction of the thermostatic medium in the chamber 33 will permit the spring 37 to move the yoke arm to position A at which position the switch is open, the damper 11 is open and air can pass through in its normal courses.

With reference to the construction shown in Figure 10, the operation is the same without the use of dampers.

It will be understood that I desire to comprehend within my invention such modifications as may be necessary to adapt it to varying conditions and uses.

Having thus fully described my invention, what I claim as new and desire to secure by Letters Patent, is:

1. In combination, a circulation passageway for delivering air to an enclosure, a damper therein, a blower communicating with said passageway above the damper and below the damper, hygrostatic means for controlling the operation of said blower means associated with said blower for adjusting the humidity of the air by-passed around said damper whereby when the humidity of the air decreases said damper will be shut and said blower placed into operation to divert the air over the humidifier before redelivery to the enclosure, and means to heat said air on its way to the enclosure.

2. In combination, a circulation passageway for delivering air to an enclosure, a damper therein, a blower communicating with said passageway above the damper and below the damper, hygrostatic means for controlling the operation of said blower means associated with said blower for adjusting the humidity of the air by-passed around said damper whereby when the humidity of the air decreases said damper will be shut and said blower placed into operation to divert the air over the humidifier before redelivery to the enclosure, means to heat said air on its way to the enclosure, a thermostat and means for circulating the fluid medium utilized in the hygrostatic means.

3. In combination, an air delivery passageway communicating with an enclosure, an enclosure, a blower communicating with said passageway at one point for the inlet of air and delivering said air at another point, a damper interposed between said points, a hygrostat adapted to be affected by the air passing through said passageway and adapted to operate said damper, a switch controlled by said hygrostat for operating said blower and a humidifier associated with said blower.

4. In combination, an air delivery passageway communicating with an enclosure, an enclosure, a blower communicating with said passageway at one point for the inlet of air and delivering said air at another point, a damper interposed between said points, a hygrostat adapted to be affected by the air passing through said passageway and adapted to operate said damper, a switch controlled by said hygrostat for operating said blower and a humidifier associated with said blower, means of supplying liquid to said hygrostat and means for regulating the supply of liquids so supplied.

5. In combination, an air delivery passageway communicating with an enclosure, an enclosure, a blower communicating with said passageway at one point for the inlet of air and delivering said air at another point, a damper interposed between said points, a hygrostat adapted to be affected by the air passing through said passageway and adapted to operate said damper, a switch controlled by said hygrostat for operating said blower and a humidifier associated with said blower, means of supplying liquid to said hygrostat and means for regulating the supply of liquids so supplied, said means being adapted to deliver the surplus liquid from the hygrostat to the humidifier.

6. In combination, an air delivery passageway communicating with an enclosure, an enclosure, a blower communicating with said passageway at one point for the inlet of air and delivering said air at another point, a damper interposed between said points, a hygrostat adapted to be affected by the air passing through said passageway and adapted to operate said damper, a switch controlled by said hygrostat for operating said blower, a humidifier associated with said blower, means of supplying liquid to said hygrostat, means for regulating the supply of liquids so supplied, said means being adapted to deliver the surplus liquid from the hygrostat to the humidifier, a thermostat, and means of maintaining a circulation of liquid in the humidifier, said means being interconnected with said thermostat whereby the circulation takes place when the blower is operated.

7. In combination, an air delivery passageway communicating with an enclosure, an enclosure, a blower communicating with said passageway at one point for the inlet of air and delivering said air at another point, a damper interposed between said points, a hygrostat adapted to be affected by the air passing through said passageway and adapted to operate said damper, a switch controlled by said hygrostat for operating said blower and a humidifier asociated with said blower, means of supplying liquid to said hygrostat, means for regulating the supply of liquid so supplied, said means being adapted to deliver the surplus liquid from the hygrostat to the humidifier, a thermostat, means of maintaining a circulation of liquid in the humidifier, said means being interconnected with said thermostat whereby the circulation takes place when the blower is operated, and means for controlling the temperature of the liquid in the humidifier.

8. In combination, an enclosure, an air delivery passageway for delivering air to the enclosure, means for removing air from the enclosure, a blower connected to said air removing means and to said air delivery passageway, a damper located between the inlet from the air passageway to the blower, and the outlet from the blower to the air passageway, a humidifier associated with said blower and a hygrostat adapted to operate said damper and said blower whereby when the damper is closed the blower will operate.

9. In combination, an enclosure, an air delivery passageway for delivering air to the enclosure, means for removing air from the enclosure, a blower connected to said air removing means and to said air delivery passageway, a damper located between the inlet from the air passageway to the blower and the outlet from the blower to the air passageway, a humidifier associated with said blower and a hygrostat adapted to operate said damper and said blower whereby when the damper is closed the blower will operate, and means to control the temperature of the liquid in the humidifier.

10. In combination, an enclosure, an air delivery passageway for delivering air to the enclosure, means for removing air from the enclosure, a blower connected to said air removing means and to said air delivery passageway, a damper located between the inlet from the air passageway to the blower and the outlet from the blower to the air passageway, a humidifier associated with said blower and a hygrostat adapted to operate said damper and said blower whereby when the damper is closed the blower will operate, a thermostat, and means controlled thereby for circulating the liquid in the humidifier operated simultaneously with the operation of the blower by the hygrostat.

11. In combination, an enclosure, an air delivery passageway adapted to deliver purified air thereto, a damper in said passageway, a thermostat for controlling said damper, a blower connected above and below the damper to the passageway, means associated with said blower for tempering the air delivered therethrough.

12. In combination, an enclosure, an air delivery passageway adapted to deliver purified air thereto, a damper in said passageway, a blower connected above and below the damper to the passageway, means associated with said blower for tempering the air delivered therethrough, said means consisting of a pool of liquid and means for controlling the temperature of said liquid, and means for tempering the air after it has been redelivered into the passageway from the blower.

13. In combination, an air inlet passageway to an enclosure, an enclosure, a pair of spaced dampers in said passageway, a blower connected into said passageway above said dampers and below said dampers, a humidifier associated therewith, a hygrostat for controlling one of said dampers and operating said blower, a thermostat for controlling the other of said dampers, said hygrostatic damper being closed when the blower is being operated.

14. In combination, an air inlet passageway to an enclosure, an enclosure, a pair of spaced dampers in said passageway, a blower connected into said passageway above said dampers and below said dampers, a humidifier associated therewith, a hygrostat for controlling one of said dampers and operating said blower, a thermostat for controlling the other of said dampers, said hygrostatic damper being closed when the blower is being operated, means to supply liquid in circulation to said humidifier, and means to operate said circulation of liquid simultaneously with the operation of the blower.

15. In combination, an air inlet passageway to an enclosure, an enclosure, a pair of spaced dampers in said passageway, a blower connected into said passageway above said dampers and below said dampers, a humidifier associated therewith, a hygrostat for controlling one of said dampers and operating said blower, a thermostat for controlling the other of said dampers, said dampers being closed when the blower is being operated, means to supply liquid in circulation to said humidifier, and means to operate said circulation of liquid simultaneously with the operation of the blower by said thermostat, and means to adjust the temperature of the liquid so circulated.

16. In combination, an air inlet passageway to an enclosure, an enclosure, a pair of spaced dampers in said passageway, a blower connected into said passageway above said dampers and below said dampers, a humidifier associated therewith, a hygrostat for controlling one of said dampers and operating said blower, a thermostat for controlling the other of said dampers, at least one damper being closed when the blower is being operated, means to supply liquid in circulation to said humidifier, and means to operate said circulation of liquid simultaneously with the operation of the blower by said thermostat, means to adjust the temperature of the liquid so circulated, and means to adjust the temperature of the air after it has passed the humidifier before delivery to the enclosure.

17. In combination, an air inlet passageway, a blower having an opening leading into said passageway and operated by a motor, a humidifier connected thereto, delivering air at a lower point into said passageway, a damper between the inlet and outlets from said blower, a hygrostat located in said passageway adapted to operate said damper, a switch controlled thereby for operating the motor in the blower, said hygrostat having a thermostatic element, a wick associated therewith, a cup for liquid associated therewith, means of supplying liquid to said cup, means of draining excessive liquid from said cup to the humidifier and float operated means for controlling the delivery of liquid to the cup depending upon the level of the liquid in the humidifier, and means of supplying liquid so controlled by the float operated means, and yielding means for maintaining said damper firmly in open or closed position as placed by the hygrostat.

18. In combination, an air passageway, a damper therein, a thermostat located in the passageway adapted to operate the damper, a motor and blower and electric switch connected to the motor and the switch adapted to be operated by the movement of the thermostat when the damper is closed, a humidifier connected to the blower, means of taking the air from the passageway above the damper through the blower to a point below the damper, and means for tempering the air in the humidifier.

19. In combination, an air passageway, a damper therein, a thermostat located in the passageway adapted to operate the damper, a motor and blower and electric switch connected to the motor and the switch adapted to be operated by the movement of the thermostat when the damper is closed, a humidifier connected to the blower, means of taking the air from the passageway above the damper through the blower to a point below the damper, means for tempering the air in the humidifier, and means to scrub excessive liquid from the air passing through the humidifier.

20. In combination, a main air passageway, a blower having an inlet and exit in communication with said main passageway, the blower being located in a by-pass, a by-pass, a humidifier in said by-pass, means in said humidifier for directing the air downwardly upon and through a pool of liquid and upwardly and out of the humidifier from the liquid means to remove the excessive liquid before the return of the air to the main passageway, a hygrostat in the main passageway for controlling the blower, a wick, and a cup associated with the hygrostat, a water supply line associated with the humidifier for said cup, a valve for controlling the supply of liquid to said cup, a float for operating said valve immersed in the liquid in the humidifier, and means for returning the excessive liquid from the cup to the humidifier whereby the moisture in the cup is regulated in proportion to the air passing through the humidifier, and the main passageway as the moisture is removed from the humidifier, and means for circulating the liquid in the humidifier.

21. In combination, a main air passageway, a blower having an inlet and exit in communication with said main passageway, the blower being located in a by-pass, a by-pass, a humidifier in said by-pass, means in said humidifier for directing the air downwardly upon and through a pool of liquid and upwardly and out of the humidifier from the liquid means to remove the excessive liquid before the return of the air to the main passageway, a hydrostat in the main passageway for controlling the blower, a wick, and a cup associated with the hygrostat, a water supply line associated with the humidifier for said cup, a valve for controlling the supply of liquid to said cup, a float for operating said valve immersed in the liquid in the humidifier, and means for returning the excessive liquid from the cup to the humidifier whereby the moisture in the cup is regulated in proportion to the air passing through the humidifier, and the main passageway as the moisture is removed from the humidifier, means for circulating the liquid in the humidifier, and means for tempering the liquid so circulated.

22. In combination, a main air passageway having an inlet and exit, a blower adapted to deliver air into said passageway, hydrostatic and thermostatic means in said passageway for controlling said blower for supplying additional air to said passageway.

23. In combination, a main air passageway having an inlet and exit, a blower adapted to deliver air into said passageway, hygrostatic and thermostatic means in said passageway for controlling said blower for supplying additional air to said passageway, and means to control the humidity of the air delivered to the blower.

24. In combination, a main air passageway having an inlet and exit, a blower adapted to deliver air into said passageway, hygrostatic and thermostatic means in said passageway for controlling said blower for supplying additional air to said passageway, means to control the humidity of the air delivered by the blower, and means to control the temperature of the air delivered by the blower.

25. In combination, a main air passageway, a blower adapted to deliver air in said passageway, hygrostatic and thermostatic means in said passageway for controlling the blower and for supplying additional air to said passageway, means to control the humidity in the air delivered by the blower, means to control the temperature of the air passing through the humidifying means consisting of a coil for the circulation of fluid through the humidifier, said coil being located in a pit in the floor of the building in which the apparatus is installed at the point where the temperature of the surroundings is materially below the temperature above ground.

26. In combination, a main air passageway, a blower adapted to deliver air in said passageway, hygrostatic and thermostatic means in said passageway for controlling the blower and for supplying additional air to said passageway, means to control the humidity in the air delivered by the blower, means to control the temperature of the air passing through the humidifying means consisting of a coil for the circulation of fluid through the humidifier, said coil being buried in the floor of the building in which the apparatus is installed, said coil being so located in the floor that it is arranged at sufficient depth and for a sufficient distance for the fluid in the coil to partake of the temperature of the earth below the surface thereof.

In testimony whereof, I affix my signature.

CHARLES P. EISENHAUER.